United States Patent [19]

Oguchi

[11] Patent Number: 4,870,563
[45] Date of Patent: Sep. 26, 1989

[54] INFORMATION PROCESSING APPARATUS HAVING A MASK FUNCTION

[75] Inventor: Tetsuji Oguchi, Tokyo, Japan

[73] Assignee: NEC Corporation, Tokyo, Japan

[21] Appl. No.: 36,754

[22] Filed: Apr. 8, 1987

[30] Foreign Application Priority Data

Apr. 8, 1986 [JP] Japan .................... 61-81709

[51] Int. Cl.⁴ .................... G06F 7/10; G06F 13/00
[52] U.S. Cl. .................... 364/200; 364/252.5; 364/259.7
[58] Field of Search .................... 364/200, 900

[56] References Cited

U.S. PATENT DOCUMENTS

| 3,366,927 | 1/1968 | Falkoff | 364/200 |
| 3,665,175 | 5/1972 | Bouricius et al. | 364/200 |
| 3,786,434 | 1/1974 | Frye et al. | 364/200 |
| 3,846,759 | 11/1974 | Drake et al. | 364/200 |
| 3,949,370 | 4/1976 | Reyling, Jr. et al. | 364/200 |
| 4,713,751 | 12/1987 | Dutton et al. | 364/200 |

Primary Examiner—Felix D. Gruber
Attorney, Agent, or Firm—Sughrue, Mion, Zinn, Macpeak & Seas

[57] ABSTRACT

An information processing apparatus having a mask operation includes a first circuit generating a first mask control signal indicating a start bit position of a data to be processed and a second circuit generating a second mask control signal indicating an end bit position of that data. The first mask control signal and the second mask control signal are applied to a gate circuit by which a non-mask signal is produced for a bit or bits from the start bit position to the end bit position and a mask signal is produced for the other bit or bits.

9 Claims, 5 Drawing Sheets

| IN \ OUT | $X_0$ -------- $X_{15}$ |
|---|---|
| 0 | 1111 1111 1111 1111 |
| 1 | 0111 1111 1111 1111 |
| 2 | 0011 1111 1111 1111 |
| 3 | 0001 1111 1111 1111 |
| 4 | 0000 1111 1111 1111 |
| 5 | 0000 0111 1111 1111 |
| 6 | 0000 0011 1111 1111 |
| 7 | 0000 0001 1111 1111 |
| 8 | 0000 0000 1111 1111 |
| 9 | 0000 0000 0111 1111 |
| A | 0000 0000 0011 1111 |
| B | 0000 0000 0001 1111 |
| C | 0000 0000 0000 1111 |
| D | 0000 0000 0000 0111 |
| E | 0000 0000 0000 0011 |
| F | 0000 0000 0000 0001 |

FIG. 3A (MEMORY) 4

| IN \ OUT | $Y_0$ -------- $Y_{15}$ |
|---|---|
| 0 | 1000 0000 0000 0000 |
| 1 | 1100 0000 0000 0000 |
| 2 | 1110 0000 0000 0000 |
| 3 | 1111 0000 0000 0000 |
| 4 | 1111 1000 0000 0000 |
| 5 | 1111 1100 0000 0000 |
| 6 | 1111 1110 0000 0000 |
| 7 | 1111 1111 0000 0000 |
| 8 | 1111 1111 1000 0000 |
| 9 | 1111 1111 1100 0000 |
| A | 1111 1111 1110 0000 |
| B | 1111 1111 1111 0000 |
| C | 1111 1111 1111 1000 |
| D | 1111 1111 1111 1100 |
| E | 1111 1111 1111 1110 |
| F | 1111 1111 1111 1111 |

FIG. 3B (MEMORY) 5

FIG.8

| | EAO = K | EAO = K+1 | EAO = K+2 |
|---|---|---|---|
| | 0000000001111111 | 1111111111111111 | 1111000000000000 |
| | REG.2 = 9<br>REG.3 = 15<br>DH = 26 | REG.2 = 0<br>REG.3 = 15<br>DH = 19 | REG.2 = 0<br>REG.3 = 3<br>DH = 3 |
| MEMORY (4)<br>(X0-----X15) | 0000000001111111 | 1111111111111111 | 1111111111111111 |
| MEMORY (5)<br>(Y0-----Y15) | 1111111111111111 | 1111111111111111 | 1111000000000000 |
| GATE CKT(6)<br>(M0-----M15) | 0000000001111111 | 1111111111111111 | 1111000000000000 |

INFORMATION PROCESSING APPARATUS HAVING A MASK FUNCTION

BACKGROUND OF THE INVENTION

The present invention relates to an information processing apparatus having a mask function, and particularly to an information processing apparatus having a mask function for masking an undesired bit or bits from among a plurality of bits read out of a memory.

An information processing apparatus, in general, manipulates a plurality of bits altogether as the unit of processing which is defined as a byte or a word. For example, an 8-bit processor accesses a memory byte by byte, i.e., 8 bits, by 8 bits, using an 8-bit data bus. In a 16-bit processor, 16 bits (two bytes=one word) are simultaneously manipulated.

However, there is a case that only a part of bits of a byte or a word are required in order to execute a desired instruction. In this case, the bit or bits to be processed must be selected from among a plurality of bits. Heretofore, this was done by a bit-shift operation. However, the bit-shift operation requires a long period of time because the non-selected bit or bits also have to be shifted bit by bit. On the other hand, a mask operation has been proposed to select a part of the bits constituting a word or a byte. In the mask operation, non-selected bit or bits are masked by using a mask signal, and only a desired bit or bits are allowed to be taken out as valid bits. However, the mask operation of the prior art has produced the mask signal by combining multiple arithmetic instructions, so that complex processing and control are necessary. For instance, in order to detect the position of a bit to be masked, a complex arithmetic calculation is required and thus, when multiple bits are to be masked, the mask operation of the prior art requires a long period of time.

SUMMARY OF THE INVENTION

It is therefore an object of the present invention to provide an information processing apparatus which can perform a mask operation at a high speed not only for a single bit but for a plurality of bits.

An information processing apparatus of the present invention contains a first means for storing a first data indicating the start bit position of a start bit from which the processing is performed, a second means for storing a second data indicating the end bit position of an end bit at which the processing is terminated, and a third means coupled to the first and second means for producing a mask signal according to the first data and the second data.

The first data and the second data consists of N bits, respectively. In the first data, each bit from the first bit to a bit just before the start bit has a first level signal, and each of the remaining bits, that is the start bit and the succeeding bit or bits, has a second level signal. In the second data, each bit from a first bit to the end bit has the second level signal, and the remaining bit or bits have the first level signal. The third means compares the first data with the second data bit by bit and produces a non-mask signal for each bit in which both the first data and the second data have the second level signals and produces a mask signal for each of the remaining bits. Thus, only the bits from the start bit to the end bit are not masked, while the remaining bit or bits are wholly masked. The third means has, for example, N gate circuits, each of which receives a bit of the first data and the corresponding bit of the second data, and produces N signals containing the mask signal and the non-mask signal. Here, one word or one byte is defined as consisting of N bits. The first means and the second means have a table of N×N bits, respectively, as described hereinafter.

According to the present invention, the mask signal and the non-mask signal are produced at high speed without using the bit-shift operation and the complex arithmetic operation. Particularly, mask signals for a plurality of bits can be produced at a high speed by the present invention, and therefore the present invention is suitable for an information processing apparatus in which each instruction is executed byte by byte or word by word.

BRIEF DESCRIPTION OF THE DRAWINGS

FIGS. 3A and 3B are tables of generating circuits 4 and 5 generating mask signal and a non-mask signal, respectively;

FIG. 8 is a diagram showing outputs of the generating circuits 4 and 5 and the gate circuit 6, respectively.

DETAILED DESCRIPTION OF THE PREFERRED EMBODIMENT

Figure 1:
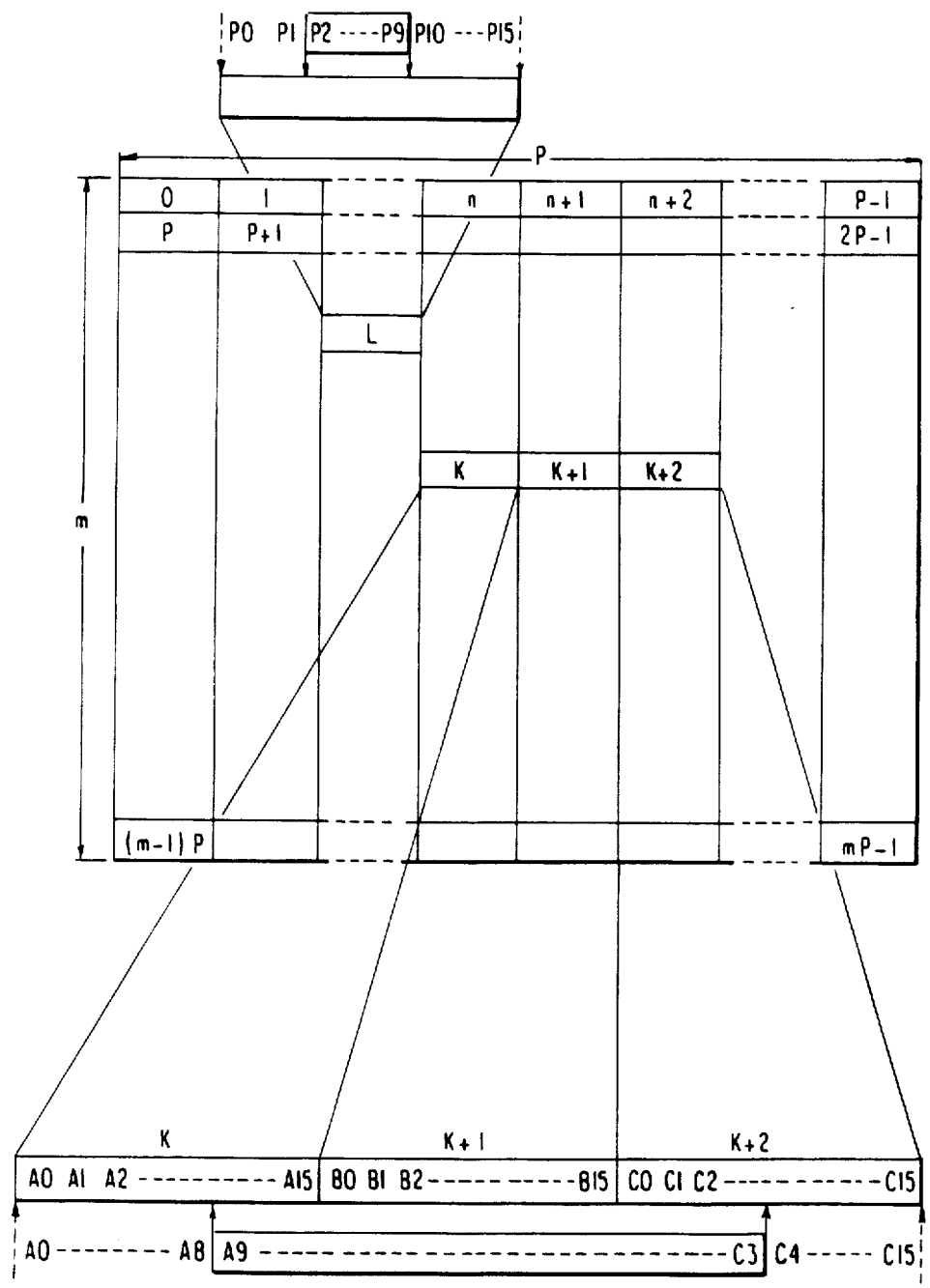
FIG. 1 is a diagram showing a memory map and a format of a data to be processed.

As shown in FIG. 1, a memory having p columns and m rows is accessed by word (or byte) addresses 0, 1, 2, ...; p, ... 2P−1, ... L, ... K, K+1, K+2, ... (mp−1). If a word consists of 16 bits, information of 16 bits is simultaneously read out of or written into the memory by one of the word addresses. It is assumed in this embodiment that one word consists of 16 bits.

When 8 bits P2 to P9 among 16 bits P0 to P15 of a word L are required in an arithmetic operation, P0, P1 and P10 to P15 must be masked.

Figure 2:
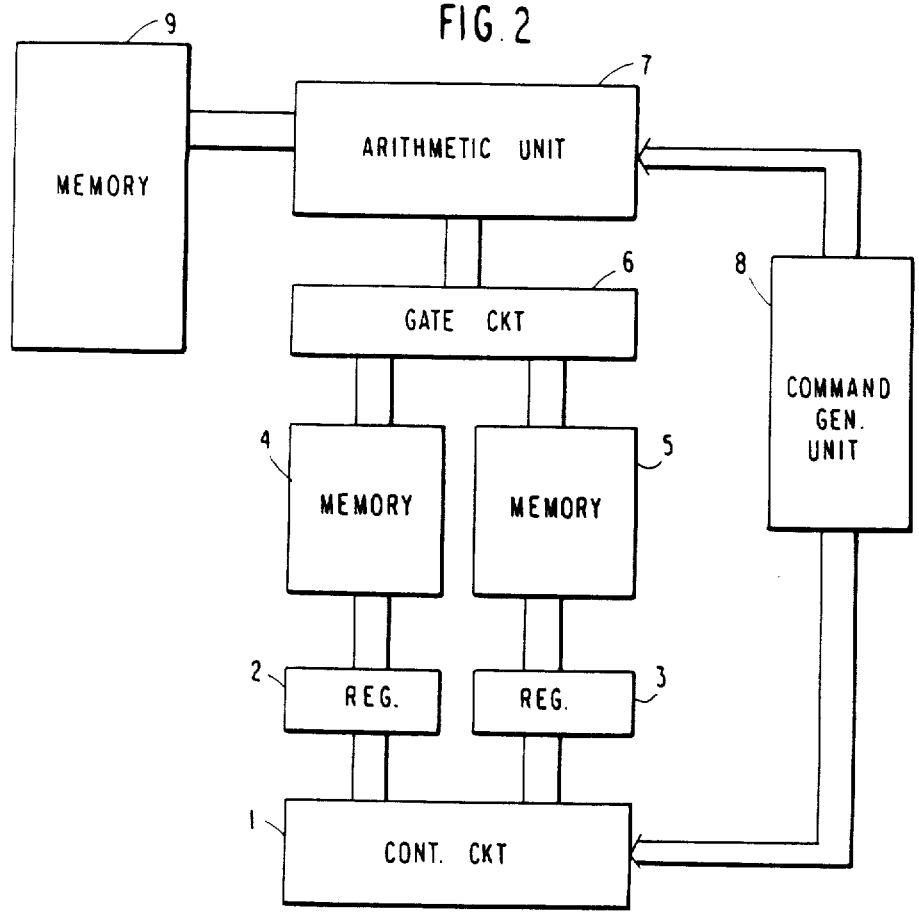
FIG. 2 is a block diagram showing an information processing apparatus of an embodiment according to the present invention.

FIG. 2 shows a block diagram of an information processing apparatus according to an embodiment of the present invention. The apparatus contains a control circuit 1, two registers 2 and 3 coupled to the control circuit 1, two memories 4 and 5 coupled to the registers 2 and 3, respectively, a gate circuit 6 coupled to output terminals of the memories 4 and 5, an arithmetic unit 7 coupled to the gate circuit 6, a command generating unit 8 coupled to the arithmetic unit 7 and the control circuit 1, and a memory 9, as shown in FIG. 1, coupled to the arithmetic unit 7. In this embodiment, the control circuit 1, the registers 2 and 3, the memories 4 and 5, and the gate circuit 6 are provided to produce the mask signal and the non-mask signal at the same time.

The memory 4 (ROM) stores the table shown in FIG. 3A and outputs 16-bit mask control signals $X_0$ to $X_{15}$ in response to any one of 16 addresses (0 to F). The memory 5 (ROM) stores the table shown in FIG. 3B and outputs 16-bit mask control signals $Y_0$ to $Y_{15}$ in response to an input data which is any one of 16 addresses (0 to F). The addresses 0 to F in FIGS. 3A and 3B are represented by a hexadecimal digit. The bit numbers of the mask control signals $X_0$ to $X_{15}$ and $Y_0$ to $Y_{15}$ are the same and equal to the bit number of one word (16 bits in this embodiment). Further, addresses of the memories 4 and 5 are also equal in number to the bits of one word. A start bit address designating a bit position from which a processing is to start is applied to the memory 4, while an end bit address designating a bit position at which the processing is to terminate is applied to the memory 5. When a word containing the end bit position is different from a word having the start bit position, the end bit address to be applied to the memory 5 is F (15) for the latter word and is calculated by using a bit length of bits to be processed for the former word as described hereinafter. In FIGS. 3A and 3B, "1" represents a non-mask control signal, while "0" represents a mask control signal.

In the memory 4, "0" is stored from a first location $X_0$ to a location just before a location corresponding to the start bit position, and "1" is stored from the location corresponding to the start bit position to a last location $X_{15}$. In the memory 5, "1" is stored from a first location $Y_0$ to a location corresponding to the end bit position, and "0" is stored from a location subsequent to the location corresponding to the end bit position to a last location $Y_{15}$. Thus, the memory 4 stores 16 first data, each representing the start bit position, and the memory 5 stores 16 second data, each representing the end bit position.

Figure 4:
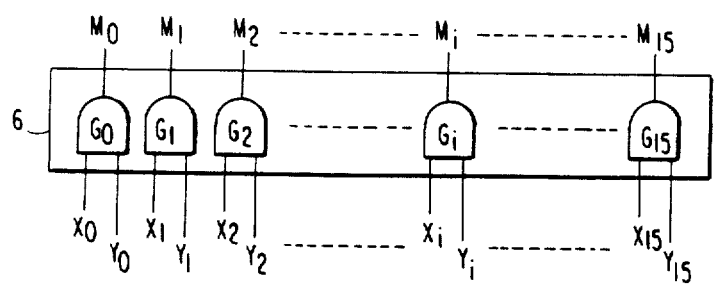
FIG. 4 is a circuit diagram of a gate circuit 6.

The output signals of the memories 4 and 5 are applied to the gate circuit 6 (FIG. 2) which produces a mask signal and a non-mask signal. The gate circuit 6 may be formed by 16 AND gates (G0 to G15) as shown in FIG. 4, each of the AND gates receives the output signal $X_i$ for a word from the memory 4 and the output signal Y for the same word from the memory 5. Thus, only the AND gate or gates which receive both "1" of the output signals $X_i$ $Y_i$ produce the non-mask signal ("1"), and the remaining AND gate or gates produce the mask signal ("0"), so that 16-bit mask control signal is generated for one word.

Figure 5:
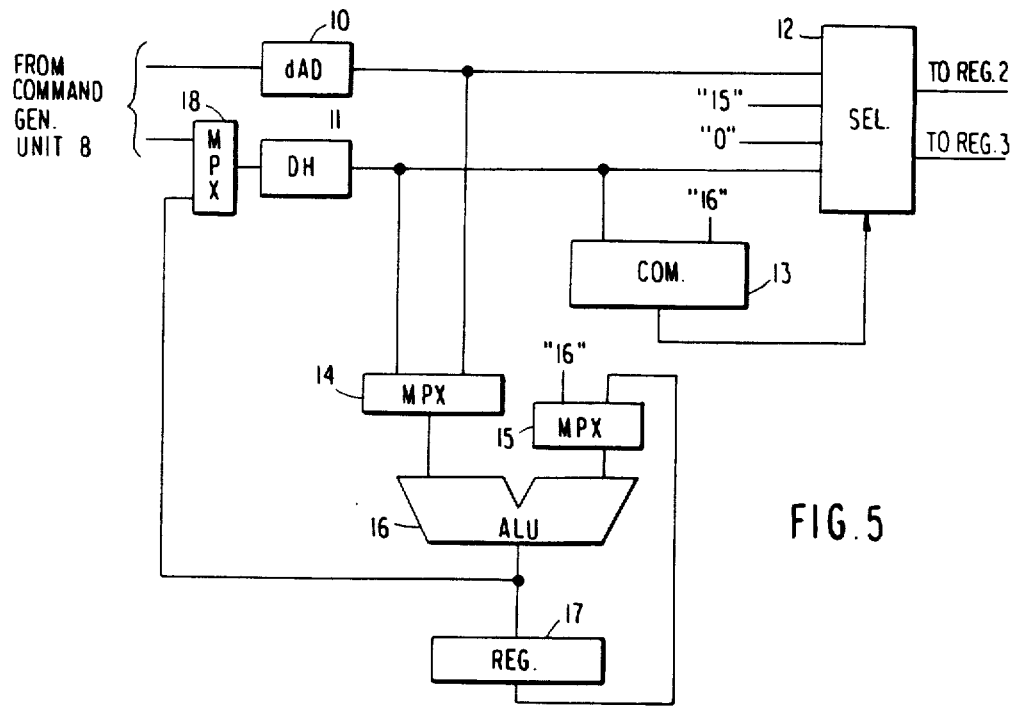
FIG. 5 is a circuit diagram of a control circuit 1.
Figure 6:
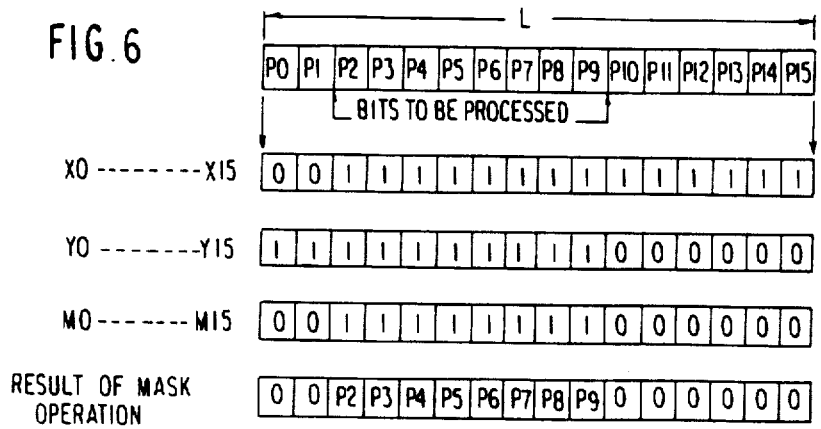
FIG. 6 is a diagram showing outputs of the memories 4 and 5 and the gate circuit 6.
Figure 7:
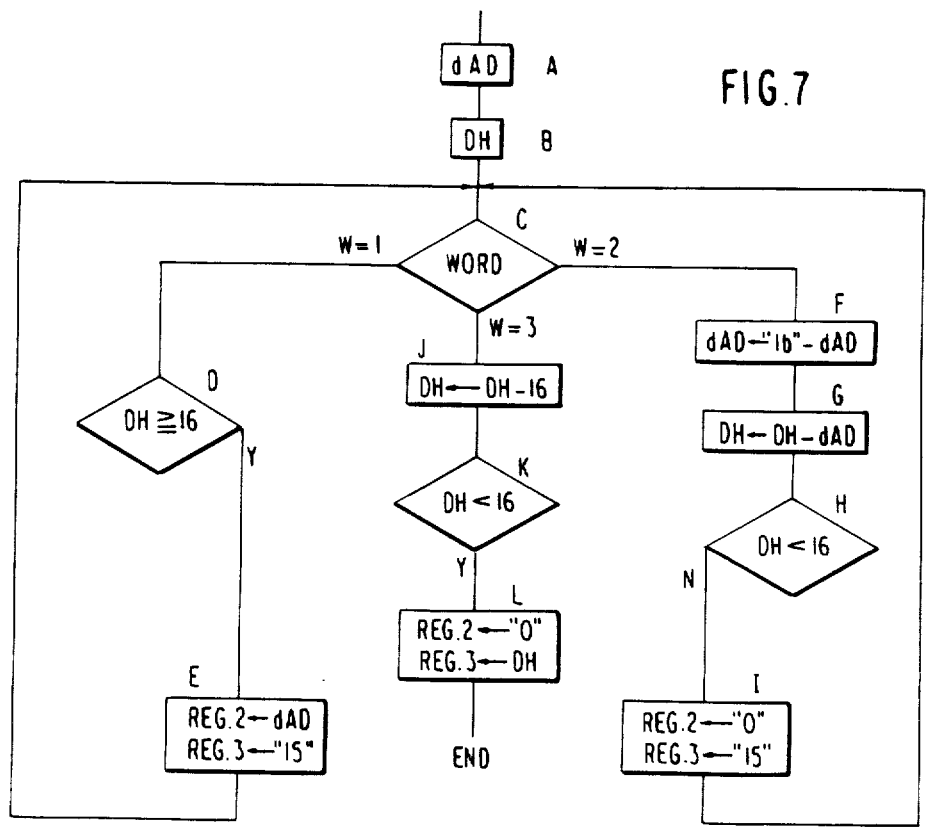
FIG. 7 is a flow chart showing an example of a mask operation of the present invention.

FIG. 5 shows a block diagram of the control circuit 1 having a register (dAD) 10 storing a bit address, a register (DH) storing a value representing a bit length to be processed, a selector 12, a comparator 13, multiplexers 14, 15 and 18, an arithmetic logic circuit 16 and a register 17. The control circuit 1 produces a first data representing a start bit position of a data to be processed and a second data representing an end bit position of the data to be processed. The first data and the second data are stored in the registers 2 and 3 of FIG. 2, respectively, as addresses to be applied to the memories 4 and 5. The control circuit 1 produces these first data and second data according to the bit address representing the start bit position and the bit length of the data to be processed, which are sent from the command generating unit 8.

The arithmetic unit 7 is coupled to the gate circuit 6, the memory 9 and the command generating unit 8 and performs an arithmetic operation commanded by the unit 8 for the data read out of the memory 9 by using the mask signal and the non-mask signal outputted from the gate circuit 6. A central processing unit (CPU) can be employed as the arithmetic unit 7, and a program memory and a decoder or sequencer are used as the command generating unit 8.

An operation for producing the mask signal and the non-mask signal will be explained with references to FIGS. 1 to 6. An address of a start bit P2 to be processed for the word L is "2", while an address of an end bit P9 is "9". Therefore, the value "2" is set into the register 2, while the value "9" is set into the register 3. These values can be directly set into the respective registers 2 and 3 when the start address and the end address are preliminarily determined. However, when only the start address and a bit length to be processed is determined, the control circuit 1 is used as described hereinafter.

The memory 4 outputs a first data (0011111111111111) as $X_0$ to $X_{15}$ therefrom in response to the content (the start address "2") of the register 2. While the memory 5 outputs a second data (1111111111000000) as $Y_0$ to $Y_{15}$ therefrom in response to a content (the end address "9") of the register 3. These two data are applied to the gate circuit shown in FIG. 4, whereby 0011111111000000 are produced by the gate circuit 6 as $M_0$ to $M_{15}$. Here, "0" represents a mask signal and "1" represents a non-mask signal. These mask and non-mask signals are supplied to the arithmetic unit 7. On the other hand, the data of the word L is read out of the memory 9 and supplied to the arithmetic unit 7. Thus, only P2 to P9 are selected among the 16-bit data of the word L as bits to be processed, and the remaining bits (P0, P1 and P10 to P15) are masked in the arithmetic unit 7 in accordance with the mask and non-mask signals (0011111111000000). The arithmetic unit 7 performs an operation commanded by the unit 8 on the selected (non-masked) bits P2 to P9 of the word L.

According to the present invention, arbitrary bit or bits can be masked at a high speed by applying the start address and the end address to the registers 2 and 3, respectively.

The present invention can be applied to mask arbitrary bit or bits from among a plurality of successive words. For example, in FIG. 1 A9 in a first word K to C3 in a third word K+2 can be selected at a high speed by the present invention. In this case, successive three word addresses K, K+1 and K+2 are sequentially applied to the memory 9. The mask operation will be described with reference to FIGS. 1-5 and 7 and 8.

The start bit A9 of the bits to be processed is indicated by the word address K and the bit address "9". While, the end bit C3 is indicated by the word address K+2 and the bit address "3". The command generating circuit 8 sends the start bit address (dAD) "9" to the register 10 of the control circuit 1 and sends the value "26" representing a bit length (DH) to be processed to the register 11, respectively (STEPS A and B). The control circuit 1 compares a content of the register 11 with a value "16" by the comparator 13 because one word consists of 16 bits (STEPS C and D). Since the content of the register 11 is larger than "16" in this case, the content "9" of the register 10 is applied to the register 2 via the selector 12. With respect to the word A0 to A15, since A9 to A15 are to be processed, the value "15" is selected by the selector 12 and is applied to the register 3 as the end bit address of that word (STEP E). At this time, 0000 0000 0111 1111 is read out of the memory 4 as the output $X_0$ to $X_{15}$, while 1111 1111 1111 1111 is read out of the memory 5 as the output $Y_0$ to $Y_{15}$. These outputs are ANDed by the gate circuit 6. As the result, 0000000001111111 is outputted from the gate circuit 6, in which "0" represents a mask signal and "1" represents a non-mask signal. Thus, A9 to A15 are selected from 16-bit data A0–A15 of the word K by the non-mask signal "1", and A0 to A8 are masked by the mask signal "0".

Next, 16-bit data B0 to B15 of the successive word K+1 is read out of the memory 9. In order to detect the number of bits which have been processed in the first word (K), the content of the register (dAD) 10 is subtracted from the value "16" by the ALU 16 in a STEP F. The result is stored in the register 17. Further, to correct the bit length to be processed, the content "26" of the register 11 is applied via multiplexer 14 to the ALU 16. The content "7" of the register 17 is also applied via the multiplexer 15 to the ALU 16. In the ALU 16, subtraction of "26" minus "7" is executed, and the result "19" is stored to the register 11 via the multiplexer 18 (STEP G). Thereafter, the content "19" of the register is compared with the value "16" by the comparator 13 (STEP H). Since the content "19" of the register 11 is larger than "16", the control unit 1 determines that all bits B0 to B15 of the second word (K+1) must be processed. Thus, the selector 12 applies "0" to the register 2 as the start bit address and applied "15(=F)" to the register 2 as the end bit address, respectively (STEP I). Consequently, 1111 1111 1111 1111 are read out of both memories 4 and 5, and therefore, the gate circuit 6 produces 1111111111111111 (all non-mask signals) for the second word K+1. Thus, the 16 bits B0 to B15 of the word K+1 are all processed by the arithmetic unit 7.

In a STEP J, to produce a mask signal for the third word K+2 (16-bit data C0 to C15) read out of the memory 9, the content of the register (DH) 11 is subtracted by the value "16" which is the number of bits to be processed for the second word K+1. The result is "3" which is smaller than the value "16". Therefore, "0" is sent to the register 2 as the start bit of the third word, and "3" is sent to the register 3 as the end address of the third word. Thus, 1111 1111 1111 1111 is read out of the memory 4, and 1111 0000 0000 0000 is read out of the memory 5, whereby the gate circuit 6 produces an output signal 1111000000000000. As a result, the first 4 bits C0 to C3 are not masked for the third word K+2, while the remaining 12 bits C4 to C15 are masked.

As described above, the mask signal and the non-mask signal can be produced by a table access operation at a high speed. Particularly, they can be produced bit by bit without a shifting operation. Further, since the arithmetic unit 7 does not participate in the mask signal producing operation, it can execute the arithmetic operation in parallel with the mask signal producing operation.

In the present invention, when a word contains both the start bit and the end bit as shown in the word L, the command generating circuit 8 may directly apply the start bit and the end bit to the registers 2 and 3, respectively, without using the control circuit 1. Further, when the same address is applied to the memories 4 and 5, all other bits except for only one bit are masked. On the other hand, when an address larger than that applied to the memory 5 is applied to the memory 4, all bits can be masked, and therefore, no operation (NOP) or a skip operation can be performed by using this mask operation. Further, a random logic circuit (e.g. a PLA circuit, an encoder circuit) may be used as the memories 4 and 5 to produce mask control signals as shown in FIGS. 3A and 3B.

What is claimed is:

1. An information processing apparatus comprising:
   a memory from which a fixed plural number of bits are read out at the same time in one read operation;
   an arithmetic unit coupled to the memory and performing an arithmetic operation on a part of the bits read out of said memory, said part being not masked by a mask signal; and
   a mask signal producing circuit means producing said mask signal for masking at least one bit among the bits read out of said memory, said mask signal producing circuit means comprising:
   a first means for generating first mask control signals consisting of said fixed number of bits, which represent a start bit position from which the arithmetic operation starts,
   a second means for generating second mask control signals consisting of said fixed number of bits, which represent an end bit position at which said arithmetic operation is terminated, and
   a third means coupled to said first means and said second means for producing said mask signal according to said first mask control signals and said second mask control signals.

2. An apparatus as claimed in claim 1, wherein said first mask control signals generated from said first means contain 1st to Nth bits in which the i-th ($1 \leq i \leq N$) bit represents the start bit position and said second mask control signals generated from said second means contain 1st to Nth bits in which the j-th ($1 \leq j \leq N$) bit represents the end bit position.

3. An apparatus as claimed in claim 2, wherein each of said 1st bit to (i−1)-th bit of said first mask control signals is a first logic level signal, each of said i-th bit to Nth bit of said first mask control signals being a second logic level signal, each of said 1st bit to j-th bit of said second mask control signals being said second logic level signal, and each of said (j+1)-th bit to N-th bit of said second mask control signals being said first logic level signal, said third means producing the mask signal corresponding to said 1st bit to said (i−1)th bit and said (j+1)-th bit to said Nth bit.

4. An apparatus as claimed in claim 1, wherein said first means has a first table memory storing said first mask control signals, said second means having a second table memory storing said second mask control signals.

5. An apparatus having a mask function for masking at least one bit among 1st to n-th bits comprising a first means for generating simultaneously first data consisting of $X_1$ to $X_n$ signals in which $X_1$ to $X_{i-1}$ signals have a first logic and $X_i$ to $X_n$ signals have a second logic, a second means for generating simultaneously second data consisting of $Y_1$ to $Y_n$ signals in which $Y_1$ to $Y_j$ signals have said second logic and $Y_{j+1}$ to $Y_n$ signals have said first logic, $X_i$ representing a start position of a bit portion not to be masked, $Y_j$ representing an end position of said bit portion not to be masked, and means coupled to said first means and said second means for producing simultaneously a mask signal for the 1st to (i−1) th bits and (j+1)-th to n-th bits and a non-mask signal for the i-th to j-th bits according to said $X_0$ to $X_n$ signals and said $Y_0$ to $Y_n$ signals.

6. An apparatus as claimed in claim 5, wherein said producing means has 1st to n-th gate means, each gate means receiving the corresponding X signal and Y signal and producing the non-mask signal when X signal and Y signal are both said second logics and the mask signal when at least one of the X signal and the Y signal is said first logic.

7. An apparatus as claimed in claim 5, wherein said $X_0$ to $X_n$ signals and said $Y_0$ to $Y_n$ signals are applied to said producing means at the same time.

8. An apparatus producing a mask signal and a non-mask signal for a plurality of bits read out of a memory comprising a first means for generating a first data indicating a start bit position from which processing starts, a second means for generating second data indicating an end bit position at which said processing is terminated, a third means coupled to said first means and said second means for activating said first means and said second means according to a start bit address designating said start bit position and an end bit address designating said end bit position, and a fourth means coupled to said first means and said second means for producing the mask signal for a part of said bits not to be processed and the non-mask signal for the remaining part of said bits to be processed according to said first data and said second data, respectively.

9. An apparatus as claimed in claim 8, further comprising a fifth means receiving said start bit address and data representing a bit length of bits to be processed for producing said end bit address according to said start bit address and said data representing the bit length.

* * * * *